United States Patent [19]

Roe et al.

[11] Patent Number: 5,648,116
[45] Date of Patent: Jul. 15, 1997

[54] METHODS FOR SUPPRESSING DUST EMISSIONS

[75] Inventors: Donald C. Roe, Burlington, N.J.; Jen-Chi Chen, Morrisville, Pa.

[73] Assignee: BetzDearborn Inc., Trevose, Pa.

[21] Appl. No.: 587,441

[22] Filed: Jan. 17, 1996

[51] Int. Cl.$^6$ .............................. B05C 1/16; B05D 5/00; B05D 7/00
[52] U.S. Cl. ...................... 427/136; 427/212; 427/221; 527/400
[58] Field of Search .................................. 427/212, 136, 427/221; 527/400

[56] References Cited

U.S. PATENT DOCUMENTS

| | | | |
|---|---|---|---|
| 3,954,662 | 5/1976 | Salyer et al. | 252/382 |
| 4,087,572 | 5/1978 | Nimerick | 427/214 |
| 4,246,124 | 1/1981 | Swanson | 252/8.55 R |
| 4,400,220 | 8/1983 | Cole, Jr. | 134/18 |
| 4,551,261 | 11/1985 | Salihar | 252/88 |
| 4,558,080 | 12/1985 | Quamme et al. | 524/72 |
| 4,579,927 | 4/1986 | Patel et al. | 527/400 |
| 4,594,268 | 6/1986 | Kirwin | 427/136 |
| 4,734,216 | 3/1988 | Kelly et al. | 252/181 |
| 4,781,839 | 11/1988 | Kelly et al. | 210/725 |
| 4,801,635 | 1/1989 | Zinkan et al. | 524/156 |
| 5,256,444 | 10/1993 | Roe | 427/136 |
| 5,514,412 | 5/1996 | McArdle | 427/136 |
| 5,576,056 | 11/1996 | Roe | 427/212 X |

FOREIGN PATENT DOCUMENTS 1228541  3/1988  Japan.

OTHER PUBLICATIONS

Condensed Tannins for Adhesives, A. Pizzi, Ind. Eng. Chem. Prod. Res. Dev. 1982, 21, 359–369.

*Primary Examiner*—Michael Lusignan
*Attorney, Agent, or Firm*—Alexander D. Ricci; Philip H. Von Neida

[57] ABSTRACT

Methods for suppressing the dissemination of dust emissions from dust producing materials are disclosed. Fugitive dust emissions are suppressed by applying aqueous solutions of a copolymer of tannin and a cationic monomer to the dust producing materials.

18 Claims, No Drawings

METHODS FOR SUPPRESSING DUST EMISSIONS

FIELD OF THE INVENTION

The present invention relates to methods for suppressing fugitive dust emissions from dust producing bulk solids by application of a copolymer of a tannin and a cationic monomer.

BACKGROUND OF THE INVENTION

Dust dissemination poses safety, health and environmental problems in many commercial environments. For instance, in many industries, such as mining, mineral processing, agricultural, power, steel and paper, the transportation, handling and storage of bulk solids is common. One major problem associated with bulk solids is dust generation and the subsequent emission of the dust into the atmosphere.

Industrial sources of fugitive dust include open operations, leaks and spills, storage, disposal, transit or poor housekeeping of sundry finely divided solid particulates. The iron and steel industries are replete with examples of the above enumerated categories. Wind erosion of exposed masses of particulate matter such as coal or mine mill tailings, fertilizers, etc. causes both air pollution and economic waste. Detrimental effects on health and cleanliness result where these fine particles are carried aloft by the winds.

A typical method for controlling or suppressing dust is to apply a water spray. However, water sprays only control dust for a short period of time depending upon environmental conditions. The application of the spray has to be repeated frequently to provide ongoing dust control.

Various treatments have been utilized to control dust emissions. U.S. Pat. No. 3,954,662 discloses aqueous foamable compositions and their use to suppress coal dust. The composition contains water, an interpolymer of a polymerizable vinyl ester and a partial ester compound interpolymerizable with the vinyl ester, and a detergent wetting agent. The interpolymer binds coal dust and keeps the dust particles encapsulated after the foam has collapsed.

U.S. Pat. No. 4,087,572 discloses a combination of an organic polymer latex such as a styrene-butadiene interpolymer and a silicone applied to the surface of a coal pile or other mass of finely divided particulate materials. In addition, a wetting agent may be incorporated to prevent premature coagulation. The combination is applied as an aqueous mixture such as by spraying.

U.S. Pat. No. 4,551,261 discloses the suppression of dust with an aqueous foam comprising a foaming agent and an elastomeric water insoluble polymer. The foam provides immediate dust suppression and eases application. The polymer coats the material and continues to suppress dust generation during handling of the material after the foam has collapsed.

U.S. Pat. No. 4,594,268 discloses the use of at least one methacrylate polymer for dust suppression. The methacrylate polymer provides dust suppression when applied to a wide variety of materials. After application, the polymer provides a tacky, water resistant coating which effectively prevents dusting while additionally acting as an anti-freeze agent.

U.S. Pat. No. 4,801,635 discloses a combination of water soluble anionic acrylic polymers and nonionic glycol polymers and anionic and nonionic surfactants useful for the control of dust emissions into the environment.

SUMMARY OF THE INVENTION

The present invention relates to methods for controlling fugitive dust emissions from bulk, granular or powdered solids. The fugitive dust emissions are controlled by applying to the solids an aqueous solution of a copolymer of a tannin and a cationic monomer.

DESCRIPTION OF THE RELATED ART

U.S. Pat. Nos. 4,558,080; 4,734,216 and 4,781,839 disclose a tannin based polymer obtained by reacting tannin with an amino compound and an aldehyde under acidic conditions. The resulting reaction product exhibits utility as a flocculant. The manufacturing process requires monitoring of the pH and intermediate viscosity during the reaction to prevent the batch from gelling. The long term stability of the product and the amount of residual amine and formaldehyde in the solution may cause environmental and handling concerns.

U.S. Pat. No. 4,246,124 teaches gelled compositions comprising water; a water-dispersible polymer selected from cellulose ethers, polyacrylamides, biopolysaccharides, and polyalkylene oxides; one or more water dispersible aldehydes; and one or more phenolic components such as resorcinol, catechol and the like, as well as selected oxidized phenolic components such as 1,4-benzoquinone of natural or synthetic origin and natural and modified tannins.

These gelled compositions possess utility at hydraulically fracturing a subterranean formation penetrated by at least one well. The gelled compositions also find utility at displacing oil within a subterranean formation penetrated by at least one well.

DETAILED DESCRIPTION OF THE INVENTION

The present invention relates to methods for suppressing the dissemination of fugitive dust particles into the atmosphere from dust producing materials comprising applying to the dust producing materials an aqueous solution of a copolymer of tannin and a cationic monomer.

Tannin, also called tannic acid, occurs in the leaf, branch, bark and fruit of many plants. As disclosed by A. Pizzi in "Condensed Tannin for Adhesives", Ind. Eng. Chem. Prod. Res. Dev. 1982, 21, pages 359–369, the natural tannins can be as "hydrolyzable" tannin and "condensed" tannin. The composition and structure of tannin will vary with the source and the method of extraction, but the empirical structure is given as $C_{76}H_{52}O_{46}$ with many OH groups attached to the aromatic rings. The tannin used in the present invention is a condensed tannin type including but not limited to those derived from Quebracho, Mimosa and Sumac. However, hydrolyzable tannins are also contemplated to be within the scope of this invention.

The present invention relates to methods for suppressing the dissemination of fugitive dust particles by applying to the dust producing material a water soluble or dispersible tannin containing polymer composition comprising a copolymer of a tannin and a cationic monomer. In another embodiment of the present invention, the water soluble or dispersible tannin containing polymer composition comprises a polymer of tannin, a cationic monomer and at least one monomer selected from the group consisting of an anionic monomer and a nonionic monomer.

The cationic monomer is selected from a group containing ethylenically unsaturated quaternary ammonium, phosphonium or sulfonium ions. Typical cationic monomers are quaternary ammonium salts of dialkylaminoalkyl(meth) acrylamides, dialkylaminoalkyl(meth)acrylates and diallyl dialkyl ammonium chloride.

The preferred cationic monomers include but are not limited to methyl chloride quaternary salt of diethylaminoethyl acrylate, dimethyl sulfate salt of diethylaminoethyl acrylate, dimethylaminoethyl acrylate, dimethylaminoethyl methacrylate, diethylaminoethyl methacrylate, dimethylaminopropyl methacrylamide, dimethylaminopropyl acrylamide, diallyldimethyl ammonium chloride and diallyldiethyl ammonium chloride. The most preferred cationic monomer is methyl chloride quaternary salt of diethylaminoethyl acrylate.

The anionic monomer is selected from the group containing ethylenically unsaturated carboxylic acid or sulfonic acid functional groups. These monomers include but are not limited to acrylic acid, methacrylic acid, vinyl acetic acid, itaconic acid, maleic acid, allylacetic acid, styrene sulfonic acid, 2-acrylamido-2-methyl propane sulfonic acid (AMPS®) and 3-allyloxy-2-hydroxypropane sulfonic acids and salts thereof. The preferred anionic monomer is acrylic acid.

The nonionic monomer is selected from the group of ethylenically unsaturated nonionic monomers which comprise but are not limited to acrylamide, methacrylamide, N-methylolacrylamide, N,N-dimethyl-acrylamide; lower alkyl ($C_1$–$C_6$) esters including vinyl acetate, methyl acrylate, ethyl acrylate, and methyl methacrylate; hydroxylated lower alkyl ($C_1$–$C_6$) esters including hydroxyethyl acrylate, hydroxypropyl acrylate and hydroxyethyl methacrylate; allyl glycidyl ether; and ethoxylated allyl ethers of polyethylene glycol, polypropylene glycol and propoxylated acrylates. The preferred nonionic monomers are allyl glycidyl ether and acrylamide.

The resulting tannin containing polymer contains from 10 to 80% by weight of tannin, 20 to 90% by weight of cationic monomer, 0 to 30% by weight of nonionic monomer and 0 to 20% by weight of anionic monomer, provided that the resulting tannin containing polymer is still water soluble or dispersible and the total weight % of cationic, nonionic and anionic monomers and tannin adds up to 100%. Preferably, when the cationic monomer and anionic monomer are present together in the tannin containing polymer, the cationic monomer comprises a greater weight percentage than the anionic monomer.

The preferred copolymer of tannin and cationic monomer contains 20 to 80 weight % of tannin. More preferably, the copolymer contains from 30 to 60 weight % of tannin and most preferably, from 30 to 50 weight % of tannin in the copolymer, provided the total weight of tannin and cationic monomer totals 100 weight %. More preferably still, the copolymers have a weight % of 30% tannin and 70% cationic monomer and 50% tannin and 50% cationic monomer. These particular copolymers are most preferred when the tannin is a Mimosa type tannin and the cationic monomer is methyl chloride quaternary salt of dimethylaminoethyl acrylate.

The number average molecular weight of the resulting tannin containing polymer is not critical, as it is still water soluble or dispersible. The tannin containing polymers may be prepared by mixing the desired monomers with tannin and initiating by a free radical initiator via solution, precipitation or emulsion polymerization techniques. Conventional initiators such as azo compounds, persulfates, peroxides and redox couples may be used. The preferred initiators are 2,2'azobis(2-amidinopropane) dihydrochloride, available as V-50 from Wako Chemicals and t-butylhydroperoxide/sodium metabisulfite (t-BHP/NaMBS). These or other initiators may be added at the end of polymerization to further react with any residual monomers.

Chain transfer agents such as alcohol, amine, formic acid or mercapto compounds may be used to regulate the molecular weight of the polymer. The resulting polymer may be isolated by well known techniques including precipitation, etc., or the polymer may simply be used in its aqueous solution.

The reaction temperature is not critical and generally occurs between 20° and 100° C., preferably 40° to 70° C. The pH of the reaction mixture is also not critical and is generally in the range of 2.0 to 8.0. The resulting tannin containing polymers are characterized by C-13 NMR, Brookfield viscosity and percent solids. The procedure for preparing the inventive copolymers may be found in pending application Ser. No. 08/246,547, the contents of which are wholly incorporated by reference herein.

The copolymers of the present invention may be applied to the dust producing material (substrate) by either spraying as a liquid onto the substrate or by applying as a foam which incorporates an effective surfactant-based foaming agent. The liquid spray incorporates a suitable solvent for the copolymers which is preferably aqueous.

For purposes of the present invention, the term "effective amount for the purpose" is defined as that amount of copolymer which will suppress the dissemination of dust. For example, aqueous solutions of from about 0.1 to about 10.0% copolymer can be sprayed or foamed onto the substrate. The feed rate of sprayed aqueous solution ranges from about 0.1 to about 10.0 gallons of solution per ton of substrate. Preferably, 0.5 to about 5.0 gallons per ton of substrate are applied by spraying.

When applied as a foam, the copolymers are fed in a range from about 0.1 to about 5.0 gallons of foamed solution per ton of substrate. Preferred foam feed rates range from about 0.5 to about 2.5 gallons of foamed solution per ton of dust producing material. The foam for the dust control treatment may be foamed and applied via conventional techniques such as those disclosed in U.S. Pat. No. 4,400,220, Cole, the contents of which are hereby incorporated by reference.

The copolymers of the present invention are suitable for use on any material prone to create dust, which can include but are not limited to rock, green and calcined petroleum coke, ores (for example, iron ore), grains, limestone, gypsum, fly ash, cement clinker, steel mill sinter, coal, bauxite, fertilizers (such as potash and phosphates), metallurgical coke dust, basic oxygen furnace dust and road dust.

The copolymers of the present invention may also be used with other additives for improved dust control. In addition to acting as foaming agents, anionic, nonionic and/or cationic surfactants may also be employed to improve the wetting properties of the copolymer solutions.

In order to more clearly illustrate this invention, the data set forth below were developed. The following examples are included as being illustrations of the invention and should not be construed as limiting the scope thereof.

Examples

The substrate tested was minus ¼ inch sub-bituminous coal. The copolymer treatments were applied as 0.25% active aqueous solutions at a feed rate of 10.0 gallon per ton.

The treated coal samples were allowed to dry for 48 hours to determine residual (long-term) dust control effects compared to control samples (coal treated with water). Relative dustiness measurements were made using a laboratory dust chamber (modified ASTM dust box). Percent dust suppression (% DS) was calculated based on the relative dustiness number (RDN) of the control versus treated samples as follows:

$$\% DS = \frac{\text{Control } RDN - \text{Treated } RDN}{\text{Control } RDN} \times 100$$

All RDN values were measured in triplicate; the average RDN value was used for the % DS calculation. The results of this testing are presented in Table 1.

TABLE I

Minus ¼ inch Sub-bituminous Coal Substrate

| Treatment | % Dust Suppression |
|---|---|
| Control (water only) | 0 |
| Treatment 1 | 49 |
| Treatment 2 | 48 |

Treatment 1 is a copolymer of 50% tannin and 50% methyl chloride quaternary salt of dimethylaminoethyl acrylate (AETAC).
Treatment 2 is a copolymer of 30% tannin and 70% AETAC.

These results demonstrate that the inventive copolymers in a range of tannin/AETAC ratios are effective at suppressing coal dust emissions.

While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

Having thus described the invention, what we claim is:

1. A method for suppressing the dissemination of fugitive dust particles into the atmosphere from dust producing materials comprising applying to said dust producing materials an effective dust suppressing amount of an aqueous solution of a copolymer of a tannin and a cationic monomer.

2. The method as claimed in claim 1 wherein said cationic monomer is selected from the group consisting of methyl chloride or dimethyl sulfate quaternary salt of dimethylaminoethyl acrylate, diethylaminoethyl acrylate, dimethylaminoethyl methacrylate, diethylaminoethyl methacrylate, dimethylaminopropyl methacrylamide, dimethylaminopropyl acrylamide, and diallyl dimethyl ammonium chloride.

3. The method as claimed in claim 2 wherein said cationic monomer is methyl chloride quaternary salt of dimethylaminoethyl acrylate.

4. The method as claimed in claim 1 wherein said tannin is a condensed tannin.

5. The method as claimed in claim 4 wherein said tannin is selected from the group consisting of Quebracho and Mimosa.

6. The method as claimed in claim 1 wherein said copolymer contains about 20 to about 80 weight percent tannin and about 80 to about 20 weight percent cationic monomer.

7. The method as claimed in claim 1 wherein the weight percent of said tannin in said copolymer is about 30 percent and the weight percent of said cationic monomer in said copolymer is about 70 percent.

8. The method as claimed in claim 1 wherein the weight percent of said tannin in said copolymer is about 50 percent and the weight percent of said cationic monomer in said copolymer is about 50 percent.

9. The method as claimed in claim 1 wherein said copolymer further comprises a monomer selected from the group consisting of a nonionic monomer and an anionic monomer.

10. The method as claimed in claim 9 wherein said nonionic monomer is selected from the group consisting of acrylamide, methacrylamide, N-methylolacrylamide, N,N-dimethylacrylamide, vinyl acetate, methyl acrylate, ethyl acrylate, methyl methacrylate, hydroxyethyl acrylate, hydroxypropyl acrylate, hydroxyethyl methacrylate, allyl glycidyl ether, ethoxylated allyl ether of polyethylene glycol, and ethoxylated allyl ether of polypropylene glycol.

11. The method as claimed in claim 9 wherein said anionic monomer is selected from the group consisting of acrylic acid, methacrylic acid, vinyl acetic acid, itaconic acid, maleic acid, allylacetic acid, styrene sulfonic acid, 2acrylamido-2-methyl propane sulfonic acid, and 3-allyloxy-2hydroxypropane sulfonic acid.

12. The method as claimed in claim 1 wherein said aqueous solution contains from about 0.1 to about 10.0% copolymer.

13. The method as claimed in claim 1 wherein said copolymer is added to said dust producing materials by spraying as an aqueous solution.

14. The method as claimed in claim 1 wherein said copolymer is added to said dust producing materials as a foamed liquid.

15. The method as claimed in claim 13 wherein said copolymer is sprayed onto said dust producing materials in an amount of about 0.1 gallons to about 10.0 gallons per ton of said dust producing materials.

16. The method as claimed in claim 14 wherein said foamed liquid is applied to said dust producing materials in an amount of about 0.1 gallons to about 5.0 gallons per ton of said dust producing materials.

17. The method as claimed in claim 1 wherein said dust producing material is selected from the group consisting of rock, green and calcined petroleum coke, ores, grains, limestone, gypsum, fly ash, cement clinker, steel mill sinter, coal, bauxite, and fertilizer.

18. The method as claimed in claim 17 wherein said coal is sub-bituminous coal.

* * * * *